United States Patent Office 2,882,307
Patented Apr. 14, 1959

2,882,307

PRODUCTION OF ORGANOPHOSPHORUS COMPOUNDS

John W. Copenhaver, Short Hills, and Charles W. Weber, Jersey City, N.J., assignors to The M. W. Kellogg Company, Jersey City, N.J., a corporation of Delaware No Drawing. Application October 30, 1953
Serial No. 389,484

31 Claims. (Cl. 260—543)

This invention relates to a new and improved process for the production of organophosphorus compounds. In one aspect this invention relates to the production of organic phosphonyl halides and the corresponding phosphonic acids and derivatives derived therefrom. In another aspect this invention relates to the production of organic phosphine oxides. In a still more particular aspect this invention relates to the production of methane phosphonyl dichloride.

The organic phosphonyl halides and especially methane phosphonyl dichloride, as well as the organic phosphine oxides, are much in demand as intermediate chemical reactants for the production of more complex organic phosphorus compounds, such as the corresponding esters, free acids and amides by conventional methods, which are useful as fungicides, insecticides, pharmaceuticals, petroleum additives for improving lubricating oils and polymer additives. Prior to the present invention, relatively low molecular weight organic phosphonyl halides and phosphine oxides have been obtained by devious and round about methods involving numerous chemical and mechanical steps. Less involved methods for the production of organic phosphonyl halides, for example, are not applicable to the production of low molecular weight analogs in good yields. Methane phosphonyl dichloride is a particularly difficult compound to produce. For example, the reaction between methane, phosphorus trichloride and oxygen is a very poor reaction and produces methane phosphonyl dichloride in very low yield, although higher molecular weight alkanes, such as n-heptane react with phosphorus trichloride and oxygen to produce the corresponding alkane phosphonyl dichlorides in somewhat better yields.

It is therefore an object of the present invention to provide a new and improved process for producing organic phosphonyl halides and organic phosphine oxides.

Another object is to produce such organophosphorus compounds with the minimum formation of by-products and with the maximum utilization of reactants.

Still another object of this invention is to provide an effective and economical process by which such organo phosphorus compounds may be prepared in high yield with good selectivity.

A further object is to provide a method for the production of methane phosphonyl dichloride in high yield with good selectivity.

Various other objects and advantages of the present invention will become apparent to those skilled in the art from the accompanying description and disclosure.

In accordance with this invention organophosphorus compounds of the general formula $R_3P=O$ including organic phosphonyl dihalides, organic phosphonyl monohalides and organic phosphine oxides are produced by a process which comprises reacting under appropriate conditions an organic ether, an organic halide and a trivalent phosphorus halide in at least two successive reaction stages in the presence of a catalyst or catalyst complex. The R groups of the general formula for the organophosphorus compounds produced in accordance with this invention represent halogens (F, Cl, Br and I) and at least one R is an organic radical. Where more than one organic radical is included in the product, or more than one halogen is included in the product, these organic radicals and halogens may be the same or different.

The reaction of this invention is conducted as a multistage reaction, and preferably as a two-stage reaction. Conducting the reaction in such a stepwise manner comprises reacting in the first step of the reaction the trivalent phosphorus halide, organic ether and the organic halide in the presence of the catalyst, the second and subsequent steps then comprise treating the product obtained in the first step with adidtional amounts of the same reactants used in the first step with or without the addition of more catalyst and with or without separating of the low boiling products from the residue or catalyst complex. In so conducting the reaction in this stepwise manner improved yields of organic phosphonyl halides are obtained by using smaller amounts of catalyst as compared to the amount of catalyst needed when the reaction is conducted as a one-stage reaction. The organic phosphonyl halide produced may be recovered directly from the reaction mixture by conventional methods, such as distillation, or may be reacted with other compounds to form derivatives thereof and the derivative recovered.

The organic ethers to be employed in accordance with this invention are selected from the group consisting of the saturated unsubstituted and substituted alkyl ethers, including the acyclic and alicyclic alkyl ethers. The substituted alkyl ethers contain substituents selected from the group consisting of the halogens, nitro group, cyano group and aryl groups. It is preferable to employ ethers in which each of the organic radicals linked to the oxygen atom contains not more than 10 carbon atoms. Ethers which give satisfactory yields of product are the symmetrical ethers (R'—O—R') in which the organic radicals (R') are the same and correspond to the organic radicals of the final products. Typical examples of the symmetrical ethers are dimethyl ether, diisopropyl ether, dibenzyl ether, alpha, alpha'-dichloro dimethyl ether, beta, beta'-oxy diproprio nitrile and beta, beta'-dinitro dipropyl ether. The ethers in which the organic radicals (R') linked to the oxygen atom are different may also be employed. When an unsymmetrical ether which is free of alpha halo substitution is used, the products are mixed products corresponding to the alkyl and cycloalkyl radicals of the ethers. Typical examples of such unsymmetrical ethers are methyl ethyl ether, ethyl benzyl ether, methyl cyclohexyl ether, propyl t-butyl ether and beta-chloroethyl benzyl ether. The mono-alpha halogenated ethers, such as those with the general formula

in which R" is hydrogen or an alkyl radical and X is a halogen (F, Cl, Br and I) have been found to give high yields of organic phosphonyl halides

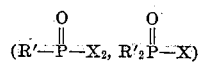

and organic phosphine oxides $(R'_3P=O)$ when employed according to this invention. Examples of a few of such halogenated ethers are: chloromethyl methyl ether, iodomethyl methyl ether, alpha-fluoroethyl propyl ether, alpha-chloroethyl propyl ether, bromomethyl isoamyl ether, chloromethyl beta-chloroisopropyl ether and alpha-bromoethyl ethyl ether.

Other types of ethers may also be employed, examples of which are as follows: straight chain polyethers, such as dimethoxy methane and diethoxyethane, cyclic monoethers, such as tetrahydrofuran, and cyclic polyoxy ethers, such as dioxane and trioxane. Mixtures of various ethers may be used also but in such a case these are obtained mixtures of products which may be separated, however, by conventional techniques, such as fractional distillation.

The organic halides employed according to this invention are the unsubstituted and substituted hydrocarbon halides, such as the alkyl, including both acylic and alicyclic, and aromatic halides, preferably having less than fifteen carbon atoms per molecule. The substituted alkyl halides are preferably those in which one or more hydrogen atoms is substituted by a corresponding number of radicals selected from the group consisting of the halogens, nitro group, cyano group, aryl groups, and sulfone group. The aromatic halides are those in which the halogen atom is activated by the presence of a nitro group, preferably at least two in the ortho and para positions of the aromatic ring. The following compounds are given as examples of suitable organic halides which may be used by this novel process and are in no way to be construed as limiting the scope of this invention: methyl chloride, methylene dichloride, ethyl bromide, isopropyl chloride, isoamyl chloride, cyclopentyl chloride, chloromethyl nitrile, hexachlorocyclohexane, tetradecyl chloride, carbon tetrachloride, trichloromethyl bromide, 1,1-difluoro-1-chloro-2,2,2-trichloroethane, cyclohexyl bromide, hexachlorohexane, methyl iodide, benzyl iodide, isopropyl fluoride, fluorobenzo dichloride, 2-cyano-1-chloroethane, 2-nitropropyl chloride, trichlorocyanopropane, nitrotrichloromethane, benzyl chloride, 2,4-dinitrochlorobenzene, para-nitrochlorobenzene, 2,4-dinitrobromobenzene, phenyl β-chloropropyl sulfone, and phenyl β-chloroethyl sulfone. Mixtures of different organic halides may be used in accordance with this invention and in such case mixtures of products will be obtained. Although any of the halogens are suitable as the halogen of the organic halide, the gaseous halogens are preferred and chlorine has been found to be the most preferable and the more economical of the halogens. The alkyl halides may be prepared in conventional manner known to those skilled in the art.

Both inorganic and organic trivalent phosphorus halides may be used as the phosphorus halide reactant of the present invention. Typical examples of inorganic trivalent phosphorus halides are as follows: phosphorus trifluoride, phosphorus trichloride, phosphorus tribromide and phosphorus triiode; mixed phosphorus halides, such as difluorophosphorus chloride, difluorophosphorus iodide, dichlorophosphorus fluoride, chlorobromophosphorus fluoride and dichlorophosphorus bromide; and diphosphorus tetraiodide. The preferred organic trivalent phosphorus halides which may be used in accordance with this invention are the hydrocarbon phosphorus halides having only a continuous carbon skeleton of not more than 15 carbon atoms, such as the acylic and alicyclic alkyl phosphorus halides, either substituted or unsubstituted, and the aromatic phosphorus halides, either substituted or unsubstituted. In general, the organic radical of the organic phosphorus halide is selected from the same classes as the organic halides previously discussed, and may be the same or different than the organic radical of the organic halide. Typical examples of organic phosphorus halides are methyl phosphorus dichloride, ethyl phosphorus difluoride, isopropyl phosphorus dichloride, benzyl phosphorus dichloride, phenyl phosphorus diiodide, diphenyl phosphorus chloride, diphenyl phosphorus bromide, 4-nitrophenyl phosphorus dibromide, 4-bromophenyl phosphorus dichloride, di(4-nitrophenyl) phosphorus chloride, methyl ethyl phosphorus chloride, methyl ethyl phosphorus bromide, diethyl phosphorus bromide, dibenzyl phosphorus chloride, dipropyl phosphorus chloride, cyclohexyl phosphorus dichloride, cyclopentyl phosphorus dibromide, beta-chlorooctyl phosphorus dichloride and cyclooctyl bromo phosphorus chloride. The halogen of the trivalent phosphorus halide may be any of the halogens, preferably the gaseous halogens, such as chlorine, without departing from the scope of the invention.

Alkoxy phosphorus halides having the general formulae $R'O—PX_2$ and $(R'O)_2PX$ may also be used as a reactant in accordance with this invention. Such alkoxy phosphorus halides are used in addition to one or more of the above type of trivalent phosphorus halide. When using organic phosphorus halides in which there is present one or more phosphorus to carbon bonds, such bonds remain intact during the course of the reactions described herein and each of the organic radicals may be present in the final product. When alkoxy phosphorus halides are employed, the oxygen to phosphorus bond is cleaved during the course of the reaction and the final product will not contain the $R'O$-radicals as such. Thus in order to obtain the maximum utilization of such alkoxy phosphorus halides it is preferable for the organic group of the $R'O$-radical to be the same as the organic group of the organic halide reactant. Typical examples of such alkoxy phosphorus halides are methoxy phosphorus dichloride, ethoxy phosphorus dibromide and dimethoxy phosphorus chloride.

The particular trivalent phosphorus halide employed depends upon the ultimate product desired. When producing an organic phosphonyl dihalide

an inorganic phosphorus trihalide ($PX_3$), or a trivalent organic phosphorus halide of the above classes, is employed. When producing an organic phosphonyl monohalide, such as methyl phenyl phosphonyl chloride, an organic phosphorus dihalide, such as phenyl phosphorus dichloride, is employed. Further when producing a phosphine oxide in which the three organic radicals may or may not be the same, an organic phosphorus monohalide of the type $R'_2PX$ (wherein the R's may or may not be the same, and may or may not be the same as the R' radical of the organic ether and organic halide reactants) is used.

The aliphatic and aromatic phosphorus halides may be prepared by reacting a phosphorus trihalide, such as the trichloride, with a dialkyl, dicycloalkyl, or diacyl mercury derivative at a temperature of 180° C. to 230° C. The dihalides are first produced and by continuing the heating for a further length of time the monohalide may be produced and recovered. The aromatic phosphorus halides may also be produced by reacting an aromatic hydrocarbon with a phosphorus trihalide in the presence of a Friedel-Crafts catalyst, such as aluminum chloride.

Although the yield of organophosphorus compound produced by the reaction which comprises reacting an organic halide, an organic ether and a trivalent phosphorus halide is satisfactory, the yield of organophosphorus compound produced may be substantially increased by the presence in the reaction mixture of a compound containing a phosphoryl group. The exact mechanism of the reaction described herein is not known. It is postulated without limiting the invention, however, that when a compound containing a phosphoryl group is used in accordance with this invention it is serving as one of the sources of oxygen in the final product. In view of this, therefore, a wide variety of compounds containing the phosphoryl group may be used in accordance with this invention, including both inorganic and organic phosphoryl compounds. The preferred phosphoryl compounds are the inorganic phosphoryl trihalides

Typical examples of suitable phosphoryl trihalides are phosphoryl trifluoride, phosphoryl trichloride, phosphoryl tribromide and the mixed phosphoryl trihalides, such as bromo phosphoryl dichloride, dichloro phosphoryl fluoride and iodo phosphoryl dichloride. Examples of organic phosphoryl compounds which give satisfactory yields of product are chloromethane phosphonyl dichloride, diethyl phosphonyl chloride, benzene phosphonyl dichloride and organic phosphates, such as trimethyl phosphate. Phosphoryl trichloride and phosphoryl tribromide have been found to be the more economical and convenient of the various phosphoryl compounds which may be employed.

The organic phosphonyl halide reactants may be produced by reacting the corresponding phosphonic acid with phosphorus pentahalide, such as the pentachloride, at room temperature. Aliphatic phosphonyl halides having at least 5 carbon atoms may also be produced by reacting an aliphatically bound hydrogen atom of a hydrocarbon with phosphorus trihalide, such as the trichloride, by blowing free oxygen through the reaction mixture at room temperature.

In general the organic reactants may include as much as 15 carbon atoms in the molecule and in a single chain, preferably, however, the number of carbon atoms per molecule and in a single carbon chain is not more than 8.

Suitable catalysts for the reaction of this invention comprise those of the metal iodide type, such as sodium iodide, potassium iodide, aluminum iodide, zinc iodide, cobalt iodide, nickel iodide and nickel iodide plus tetrakistrichlorophosphine; both inorganic phosphorus iodides and organic phosphonium iodides, such as phosphorus diiodide and tetramethyl phosphonium iodide; free iodine; and Friedel-Crafts type catalysts, such as aluminum chloride, aluminum bromide, zinc chloride and boron trifluoride. The iodine containing catalysts are preferred, especially for multi-stage operation. Small amounts of phosphorus triiodide and methyl iodide, although classed as reactants may act as catalysts when other reactants are used as the principal reactants. The catalyst is generally employed in an amount between about 0.01 mole and about 1.5 moles per mole of trivalent phosphorus halide for the overall process. Preferably, between about 0.02 mole and about 0.5 mole of catalyst is employed per mole of trivalent phosphorus halide. The catalyst may be introduced only into the first stage of the reaction, if desired.

The amount of phosphoryl compound which may be employed is not critical to the production of phosphonyl halides and phosphine oxides as described herein. The mole ratio of phosphoryl compound to trivalent phosphorus halide may vary over a relatively wide range, such as between 0 and about 5. When a phosphoryl compound is employed the preferable range is between about 0.2 mole and about 2 moles of phosphoryl compound per mole of trivalent phosphorus halide. Although amounts of phosphoryl compound in excess of 5 moles may be used without seriously interfering with the formation of the desired organophosphorus compounds, the use of such excessive amounts of this reactant is not necessary and may only add to the cost of production of desired products.

Generally the mole ratio of the organic ether reactant with respect to the trivalent phosphorus halide reactant will range from about 0.05 to about 2.0; the preferable range being between about 0.1 and about 0.8 or about 1.0. Similarly the mole ratio of the organic halide reactant with respect to the trivalent phosphorus halide can vary over a relatively wide range when producing phosphonyl halides and phosphine oxides according to the present invention. In general the organic halide may be employed in an amount equal to about 0.1 mole to about 4.0 moles per mole of trivalent phosphorus halide, the preferable amount being between about 0.2 mole and about 2.5 moles of organic halide per mole of trivalent phosphorus halide.

As stated previously organic phosphonyl halides and organic phosphine oxides may be produced by the reaction between an organic halide, an organic ether and a trivalent phosphorus halide in the absence of a phosphoryl compound as illustrated by the following typical general reactions for all stages of the process wherein only the chief reaction product is shown:

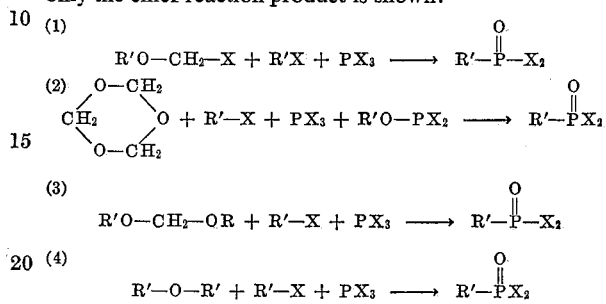

Other typical general reactions for all stages of the process of this invention are the following, where for the purpose of simplicity, $O{=}P{\equiv}$ will be used to represent the phosphoryl group of the phosphoryl-containing compound and wherein only the chief reaction product will be shown:

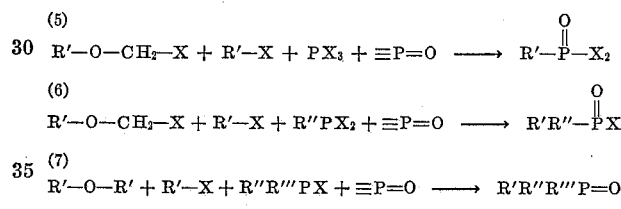

The R', R'' and R''' groups in the chemical formulas shown above represent organic radicals as previously discussed and may be the same or different, and X represents a halogen atom (Cl, F, Br and I).

The following equation for the production of methane phosphonyl dichloride by the reaction between chloromethyl methyl ether, methyl chloride, phosphorus trichloride and phosphoryl trichloride is cited as a typical specific example of the overall reaction and is not to be construed as limiting the scope of the present invention:

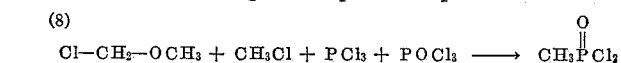

The process of the present invention is operative in all stages at a temperature between about room temperature (20° C.) and the decomposition temperature of the reactants. Generally the temperature of the reaction for all stages of the process will be below about 300° C. The reaction may be effected at elevated temperatures by introducing the individual reactants, either separately or together, into a reaction zone, such as a steel bomb, and carrying out the reaction under autogenous conditions of pressure as a matter of convenience. The preferred temperature range for each stage of the process is between about 150° C. and about 275° C. The overall time of reaction may vary over relatively wide limits, such as between about 10 minutes and about 30 hours, but the preferable contact time or residence has been found to be between about 1 and about 15 hours.

The usual procedure for effecting the reaction in two stages is to introduce the reactants and catalyst into the first stage reaction zone and permitting the reaction to continue for about 2 to 10 hours. At this time additional reactants, and if desired some additional catalyst, are added to the reaction mixture and the reaction continued for another period of 2 to 10 hours. The product is then recovered as previously discussed.

Between reaction stages, the products may be distilled from the reaction mixture leaving the residue containing catalyst complexes for the second stage reaction. The residue and unreacted reactants and by-products may be recycled from the second stage to the first stage, particularly in a continuous type reaction process without departing from the scope of this invention. Initiating the first stage reaction with product residue is beneficial as it increases the rate of reaction and yield of desired product.

The reaction may also be carried out in batchwise or continuous systems without departing from the scope of this invention.

Any free iodine which may be present upon completion of the reaction is conveniently separated by treating the crude product with mercury, followed by removal of the mercury salts. The products of the reaction obtained between stages or from the final stage are further purified by conventional methods, such as distillation or crystallization of solid products depending upon the physical nature of the products. Liquid products may be separated as almost one hundred per cent pure by efficient fractional distillation. The phosphonyl halides may be isolated as such or may be hydrolyzed to the corresponding phosphonic acids which may then be converted to various ester derivatives, or the phosphonyl halides may be converted directly to a desired type ester by conventional methods. These derivatives have many known uses to those skilled in the art as previously discussed. The products are identified by the usual methods, such as determination of boiling point and other such physical properties, determination of infrared absorption spectra, percent composition analysis, mass spectrometer analysis, etc.

The reaction may be effected in the presence of liquid diluents or solvents, such as benzene, nitrobenzene, toluene and hexane, in which the reactants are dissolved or dispersed by mechanical agitation or by conventional emulsifying agents.

It is to be understood that the choice of temperature of reaction, contact time, molar quantities of reactants and catalyst to be preferred in any instance will depend upon the starting materials employed, the number of stages, and the result desired, and that the procedure employed for the isolation and purification of desired products will be dependent upon the physical nature of the products. Although the theory and mechanism of reaction is believed to be correct, other theories may explain the reaction of the present invention, and the theories advanced herein are not to be construed as an unnecessary limitation on the invention.

The following examples are offered as a better understanding of the present invention, but the examples are not to be considered as unnecessarily limiting the present invention:

Example 1

A 200 ml. steel pressure bomb was charged with 12.0 grams (0.13 mole) of trioxane, 56.8 grams (0.4 mole) of methyl iodide, and 106 ml. (1.2 moles) of phosphorus trichloride. The bomb was then closed, placed in a reciprocating shaker, heated to 200° C. and held at this temperature for a period of 7 hours. The bomb was then cooled and vented to atmospheric pressure. The total crude product in the bomb was transferred to a distilling flask and heated at atmospheric pressure to obtain two liquid fractions with boiling points of 64° C. to 90° C. and 90° C. to 173° C. The low boiling fraction consisted chiefly of unreacted starting materials. The higher boiling fraction was dissolved in purified chloroform, shaken with mercury and filtered to remove the mercury iodide salts thus formed. After evaporation of the chloroform the higher boiling liquid fraction (B.P. 90° C. to 173° C.) was purified further by distillation at atmospheric pressure to yield two liquid fractions boiling at 65° C. to 90° C. and 149° C. to 164° C., respectively. The higher boiling fraction (B.P. 149° C. to 164° C.) contained substantial amounts of methane phosphonyl dichloride.

Example 2

A 200 ml. steel pressure bomb was charged with 6.09 grams (0.08 mole) of dimethoxymethane, 4.0 grams (0.073 mole) of methyl chloride, 21 ml. (0.24 mole) of phosphorus trichloride and 12.5 grams (0.04 mole) of nickel iodide. The bomb was then closed, placed in a reciprocating shaker, heated to 250° C. and held at this temperature for a period of 7 hours. The bomb was then cooled and vented to atmospheric pressure and charged further with 24.3 grams (0.32 mole) of dimethoxymethane, 13.2 grams (0.26 mole) of methyl chloride and 85 ml. (0.96 mole) of phosphorus trichloride. The bomb was then closed, placed in the reciprocating shaker, heated at a temperature of 250° C. for an additional 7 hours. The total crude in the bomb was transferred to a distilling flask and heated at atmospheric pressure. Two liquid fractions were obtained: the first fraction had a boiling point of 39° C. to 120° C.; the second fraction had a boiling point of 120° C. to 208° C. The low boiling fraction was freed of iodine by shaking with mercury followed by filtration to remove the mercury salts; this fraction was found to be chiefly unreacted starting compounds. The high boiling fraction was diluted with purified chloroform, shaken with mercury and filtered to remove the mercury salts. After removal of the chloroform from the high boiling fraction, this fraction was purified further by distillation at elevated temperatures and atmospheric pressure. A liquid fraction weighing 54.0 grams and having a boiling point of 140° C. to 168° C. contained 49.8 grams of methane phosphonyl dichloride as determined by mass spectrometer analysis.

Example 3

A 200 ml. steel bomb was charged with 23 ml. (0.3 mole) of chloromethyl methyl ether, 33.2 grams (0.66 mole) of methyl chloride, 70 ml. (0.9 mole) of phosphorus trichloride, 27 ml. (0.3 mole) of phosphoryl trichloride and 46.9 grams (0.15 mole) of nickel iodide. The bomb was then closed, placed in a reciprocating shaker and heated to 250° C. and held at this temperature for a period of 7 hours. After cooling, the bomb was vented to atmospheric pressure. The total crude product in the bomb was transferred to a distilling flask and heated at atmospheric pressure. Two liquid fractions were obtained: the first fraction had a boiling point of 41° C. to 121° C.; the second fraction had a boiling point of 121° C. to 183° C. The low boiling fraction was freed of iodine by shaking with mercury followed by removal of the mercury salts by filtration; this fraction was found to be chiefly unreacted starting compounds. The high boiling fraction was diluted with purified chloroform, shaken with mercury and filtered to remove the mercury salts. After removal of the chloroform from the high boiling fraction this fraction was further purified by distillation at atmospheric pressure. A liquid fraction weighing 60.4 grams and having a boiling point of 140° C. to 165° C. contained 50.1 grams of methane phosphonyl dichloride as determined by mass spectrometer analysis.

Example 4

A 200 ml. steel pressure bomb was charged with 4.5 ml. (0.06 mole) of chloromethyl methyl ether, 11.8 grams (0.23 mole) of methyl chloride, 16 ml. (0.18 mole) of phosphorus trichloride, 5.5 ml. (0.06 mole) of phosphoryl trichloride and 9.38 grams (0.03 mole) of nickel iodide. The bomb was then closed, placed in a reciprocating shaker, heated to 250° C. and held at this temperature for 7 hours. The bomb was then cooled and vented to atmospheric pressure and charged further with 18.1 ml. (0.24 mole) of chloromethyl methyl ether, 22.7 grams (0.45 mole) of methyl chloride, 63 ml. (0.72 mole of phosphorus trichloride, and 22 ml. (0.24 mole) of phosphoryl trichloride. The bomb was then closed, placed in the reciprocating shaker, and heated at a temperature of 250° C. for an additional 7 hours. The total crude product was transferred to a distilling flask and heated at atmospheric pressure. Two liquid fractions were obtained: the first fraction had a boiling point of 41° C. to 120° C.; the second fraction had a boiling point of 120° C. to 183° C. The iodine was removed from both of these fractions as described in Example 1. The low boiling fraction was chiefly unreacted starting compounds but also contained a small amount of an organophosphorus compound having a mass spectrum corresponding to that of methyl dichloro phosphine. The high boiling fraction was further purified by distillation at elevated temperature and atmospheric pressure and yielded a fraction boiling at 138° C. to 167° C. The mass spectrometer analysis of this fraction (B.P. 138° C. to 167° C. indicated the presence of 52.0 grams of methane phosphonyl dichloride.

Phosphine oxides and other organic phosphonyl halides which may be produced in accordance with the foregoing description and examples are: trimethyl phosphine oxide, tripropyl phosphine oxide, dimethyl ethyl phosphine oxide, methyl diphenyl phosphine oxide, methyl ethyl phenyl phosphine oxide, methyl phenyl benzyl phosphine oxide, dimethyl phosphonyl chloride, methyl ethyl phosphonyl chloride, dipropyl phosphonyl chloride, ethyl phenyl phosphonyl chloride, methyl phenyl phosphonyl chloride, dimethyl phosphonyl bromide, methyl ethyl phosphonyl bromide, 2-chloroethane phosphonyl dichloride, cyclohexane phosphonyl dichloride, tertiary-butane phosphonyl dichloride and 2-chloroethane phosphonyl dibromide.

This invention relates to a process of interacting an organic halide, a trivalent phosphorus halide and an organic ether in stages and various modifications and alterations of procedure and operating conditions may become apparent to those skilled in the art without departing from the scope of this invention.

Having described our invention, we claim:

1. A process which comprises reacting a phosphorus trihalide, an organic ether free of aliphatic unsaturation and having not more than 10 carbon atoms in each of the organic radicals linked to the ether oxygen and an alkyl halide having less than 15 carbon atoms in the alkyl radical attached to halogen in the presence of residue from a previous reaction of a phosphorus trihalide, aforesaid organic ether and aforesaid alkyl halide in the presence of a catalyst at a temperature between about 20° C. and about 300° C., for a period of time between about 10 minutes and about 30 hours to produce an organic phosphonyl dihalide.

2. The process of claim 1 in which the said catalyst is a metal iodide.

3. The process of claim 2 in which the said metal iodide is nickel iodide.

4. The process of claim 2 in which the said metal iodide is zinc iodide.

5. The process of claim 2 in which the said metal iodide is cobalt iodide.

6. The process of claim 1 in which the said catalyst is iodine.

7. The process of claim 1 in which said catalyst is a Friedel-Crafts type catalyst.

8. The process of claim 7 in which said catalyst is aluminum chloride.

9. The process of claim 1 in which said phosphorus trihalide is phosphorus trichloride.

10. The process of claim 1 in which said phosphorus trihalide is phosphorus tribromide.

11. The process of claim 1 in which said phosphorus trihalide is dichlorophosphorus fluoride.

12. The process of claim 1 in which the ether is trioxane.

13. The process of claim 1 in which the methyl ether is chloromethyl ether.

14. The process of claim 1 in which said ether is dimethoxy methane.

15. The process of claim 1 in which the ether is dimethyl ether.

16. The process of claim 1 in which said ether is methyl ethyl ether.

17. The process of claim 1 in which the alkyl halide is methyl chloride.

18. The process of claim 1 in which said alkyl halide is methyl iodide.

19. The process of claim 1 in which said alkyl halide is trichloromethyl bromide.

20. The process of claim 1 in which said alkyl halide is difluorotetrachloroethane.

21. The process of claim 1 in which said alkyl halide is n-butyl chloride.

22. A process for the production of an organic phosphonyl dihalide which comprises reacting a phosphorus trihalide, an aliphatically saturated organic ether having not more than ten carbon atoms in each of the organic radicals attached to the ether oxygen and an alkyl halide having less than fifteen carbon atoms in the alkyl radical attached to halogen and a catalyst at a temperature between about 150° C. and about 275° C., the said reaction being conducted as a multi-stage reaction; the first stage of which comprises reacting a phosphorus trihalide, aforesaid organic ether and aforesaid alkyl halide in the presence of a catalyst for a period of time between about 1 and about 15 hours without addition of further reactants during the first stage, and the second and subsequent stages of which comprises reacting for an additional period of time between about 1 and about 15 hours additional aforesaid phosphorus trihalide, aforesaid ether, and aforesaid alkyl halide in the presence of residue from the first stage to produce an organic phosphonyl dihalide, and recovering the phosphonyl dihalide thus produced as a product of the process.

23. The process of claim 22 in which said phosphorus trihalide is phosphorus trichloride and said alkyl halide is methyl chloride and the product is methane phosphonyl dichloride.

24. The process of claim 23 in which the organic ether is dimethoxymethane.

25. The process of claim 23 in which the organic ether is chloromethyl methyl ether.

26. The process of claim 22 in which said first stage reaction is carried out in the presence of nickel iodide as the catalyst.

27. The process of claim 22 in which the second stage reaction is carried out in the presence of the total reaction mixture of the first stage reaction.

28. The process of claim 22 in which products of reaction are distilled from the reaction mixture to leave a residue between stages.

29. A process which comprises reacting phosphorus trichloride, a saturated organic ether having not more than 10 carbon atoms in each of the organic radicals attached to the ether oxygen and methyl chloride in the presence of nickel iodide as catalyst at a temperature between about 150° C. and about 275° C., the said reaction being conducted as a multi-stage reaction; the first stage of which comprises reacting phosphorus trichloride, the aforesaid organic ether and methyl chloride in the presence of nickel iodide as catalyst for a period of time between about 1 and about 15 hours without addition of further reactants during the first stage, and the second and subsequent stages of which comprises reacting for an additional period of time between about 1 and about 15 hours additional phosphorus trichloride, aforesaid ether, and methyl chloride in the presence of residue from the first stage to produce an organic phosphonyl dihalide, and recovering the phosphonyl dihalide thus produced as a product of the process.

30. A process which comprises reacting a phosphorus trihalide, a saturated organic ether having not more than 10 carbon atoms in each of the organic radicals attached to the ether oxygen and an alkyl halide having less than 15 carbon atoms in the alkyl radical attached to halogen at a temperature between about 150° C. and about 275° C., the said reaction being conducted as a multi-stage reaction; the first stage of which comprises reacting a phosphorus trihalide, the aforesaid organic ether and the aforesaid alkyl halide for a period of time between about 1 and about 15 hours without addition of further reactants during the first stage, and the second and subsequent stages of which comprises reacting for an additional period of time between about 1 and about 15 hours additional phosphorus trihalide, aforesaid ether, and aforesaid alkyl halide in the presence of residue from the first stage to produce an organic phosphonyl dihalide, and recovering the phosphonyl dihalide thus produced as a product of the process.

31. A process which comprises reacting a phosphorus trihalide, an organic ether free of aliphatic unsaturation and having not more than 10 carbon atoms in each of the organic radicals linked to the ether oxygen, and an alkyl halide having not more than 15 carbon atoms in the presence of residue from a previous reaction of a phosphorus trihalide, aforesaid ether, and aforesaid alkyl halide, to produce an organic phosphonyl dihalide.

References Cited in the file of this patent
UNITED STATES PATENTS

| | | |
|---|---|---|
| 2,146,584 | Lipkin | Feb. 7, 1939 |
| 2,252,675 | Prutton et al. | Aug. 12, 1941 |
| 2,276,492 | Jolly et al. | Mar. 17, 1942 |
| 2,489,917 | McCombie et al. | Nov. 29, 1949 |
| 2,500,022 | Brown | Mar. 7, 1950 |
| 2,683,168 | Jensen et al. | July 6, 1954 |

OTHER REFERENCES

Webster's New International Dictionary, 2nd ed., unabridged (1950), page 546.

Kosolapoff: Organo-phosphorus Compounds (August 1950), pp. 48, 62.

UNITED STATES PATENT OFFICE

CERTIFICATE OF CORRECTION

April 14, 1959

Patent No. 2,882,307

John W. Copenhaver et al

It is hereby certified that error appears in the printed specification of the above numbered patent requiring correction and that the said Letters Patent should read as corrected below.

Column 9, lines 74 and 75, for "methyl ether is chloromethyl ether" read -- ether is chloromethyl methyl ether --.

Signed and sealed this 13th day of October 1959.

(SEAL)
Attest:

KARL H. AXLINE
Attesting Officer

ROBERT C. WATSO
Commissioner of Patent